US007055742B2

(12) United States Patent
Sinha

(10) Patent No.: US 7,055,742 B2
(45) Date of Patent: Jun. 6, 2006

(54) METHOD FOR SECURE ON-LINE VOTING

(75) Inventor: Suyash Sinha, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 10/879,405

(22) Filed: Jun. 29, 2004

(65) Prior Publication Data

US 2005/0284935 A1 Dec. 29, 2005

(51) Int. Cl.
*G06C 13/00* (2006.01)
*G06K 17/00* (2006.01)

(52) U.S. Cl. ...................................................... 235/386

(58) Field of Classification Search ................ 235/380, 235/375, 386; 709/225, 229
See application file for complete search history.

(56) References Cited

U.S. PATENT DOCUMENTS

| | | | | |
|---|---|---|---|---|
| 2002/0029260 | A1* | 3/2002 | Dobbins et al. | 709/225 |
| 2002/0169756 | A1* | 11/2002 | Biddulph | 707/3 |
| 2003/0034393 | A1* | 2/2003 | Chung | 235/386 |
| 2003/0047604 | A1* | 3/2003 | McClure et al. | 235/386 |
| 2003/0136835 | A1* | 7/2003 | Chung et al. | 235/386 |
| 2004/0046021 | A1* | 3/2004 | Chung | 235/386 |
| 2004/0098493 | A1* | 5/2004 | Rees | 709/229 |
| 2004/0119814 | A1* | 6/2004 | Clisham et al. | 348/14.08 |
| 2004/0169077 | A1* | 9/2004 | Petersen et al. | 235/386 |

OTHER PUBLICATIONS

Bederson, B.B. et al., "Electronic Voting System Usability Issues", *CHI,* 2003, 5(1), 145-152.
Bouras, C. et al, "An Electronic Voting Service to Support Decision-Making in Local Government", *Telematics and Informatics,* 2003, 20(3), 255-274.
Meltra, C. et al., "Compact and Low Power On-Line Self Testing Voting Scheme", *Workshop on Defect and Fault-Tolerance in VLSI Systems,* 1997, 137-147.
Patel, D.R., "A Simple On-Line Voting Scheme", *Redefining Internet in the Context of Pervasive Computing, Proceedings of the 15th International Conference on Computer Communication,* 2002, 591-600.

* cited by examiner

*Primary Examiner*—Thien M. Le
*Assistant Examiner*—Thien Mai
(74) *Attorney, Agent, or Firm*—Woodcock Washburn LLP

(57) ABSTRACT

A voting application on a computing device of a voter sends a challenge including data identifying and verifying the voter, the challenge is validated to ensure that the identified voter allowed to vote, and a response is sent with a vote identification value identifying the voter as being activated. A ballot is then sent to the voting application and presented thereby to the voter based on which voting information is gathered from the voter. The voting application then sends a vote package with the vote identification value and the gathered voting information, and the vote package is validated to ensure that the vote identification value matches the vote identification value matches. The voting information from the vote package is then tallied.

21 Claims, 5 Drawing Sheets

METHOD FOR SECURE ON-LINE VOTING

TECHNICAL FIELD

The present invention relates to a method by which secure on-line voting may be accomplished. More particularly, the present invention relates to such a method whereby such on-line voting is closely controlled by a vote counting authority to prevent fraud and abuse even though such voting takes place on a computing device and with a voting application that is not in the physical control of the vote counting authority.

BACKGROUND OF THE INVENTION

Voting, and especially voting for a political election or the like, should be monitored and closely controlled to prevent fraud and abuse. Accordingly, and in the prior art, voting for such a political election in particular is held at specified polling places, based on certified voter rolls, with specialized vote counting machinery, and with polling judges, workers, and the like in attendance, among other things. With such monitoring and close control, then, a particular voter should only be allowed to vote once, and in the name of such particular voter and no one else. In addition, with such monitoring and close control, the selections made by the particular voter should be honored and not altered in any manner, especially by any nefarious entity that might wish to influence the election in an inappropriate manner.

With the advent of personal computing, interconnected data networks such as the Internet, and the wide use of personal computing devices to perform tasks, it would seem that a voter voting in an election or the like should be able to do so by way of a computing device coupled by way of a network to a vote gathering service maintained by a vote counting authority. As should no doubt be appreciated, voting by way of a computing device would free the voter from the need to actually visit a specific polling place, and would also free the voter from any un-pleasantries associated therewith, including taking time off from other activities, traveling to the polling place, possibly waiting at the polling place for others to vote, and being required to employ possibly unfamiliar vote counting machinery, among other things. Moreover, voting by way of a computing device would allow the voter to vote from wherever the voter may be located, be it work, home, at a library, or elsewhere, presuming of course the voter at the location was properly provisioned with appropriate hardware, software, and communications access.

However, it is to be appreciated that a vote counting authority is likely highly hesitant to allow a voter to vote from a place other than a polling location, especially inasmuch as such voting would take place on a computing device and with a voting application that is not in the physical control of the vote counting authority. Put simply, such vote counting authority is likely rightfully concerned that allowing a voter to vote from a place other than a polling location is an invitation to fraud and abuse, especially by the aforementioned nefarious entity that might wish to influence the election in an inappropriate manner.

Accordingly, a need exists for a method for implementing secure and trustworthy voting from a place other than a polling location. In particular, a need exists for a method for implementing such voting by way of a computing device appropriately coupled to a vote gathering service and appropriately provisioned with a voting application. Further, a need exists for a method for implementing such voting that is not prone to fraud or abuse.

SUMMARY OF THE INVENTION

The aforementioned needs are satisfied at least in part by the present invention in which a method and architecture are provided to collect a vote from a voter at a computing device. In the method, the voting application on the computing device of the voter sends a challenge including collected challenge data identifying the voter and verifying the identity of the voter at the voting application, and the challenge and challenge data therein are verified and validated at least in part to ensure that the identified voter in the challenge data in fact provided the challenge data, and is in fact allowed to vote. Thereafter, a response is sent to the voting application including a vote identification value identifying the voter as being activated, and the vote identification value and an identification of the voter are stored in a database.

A ballot including at least one contest for the voter to vote on is sent to the voting application, and the voting application presents the ballot to the voter and gathers voting information from the voter based thereon. The voting application then sends a vote package with the vote identification value and the gathered voting information, and the vote package and vote identification value therein are verified and validated at least in part to ensure that the vote identification value matches the vote identification value from the database. The vote identification value from the vote package is noted in the database as having been employed, and the voting information from the vote package is tallied.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
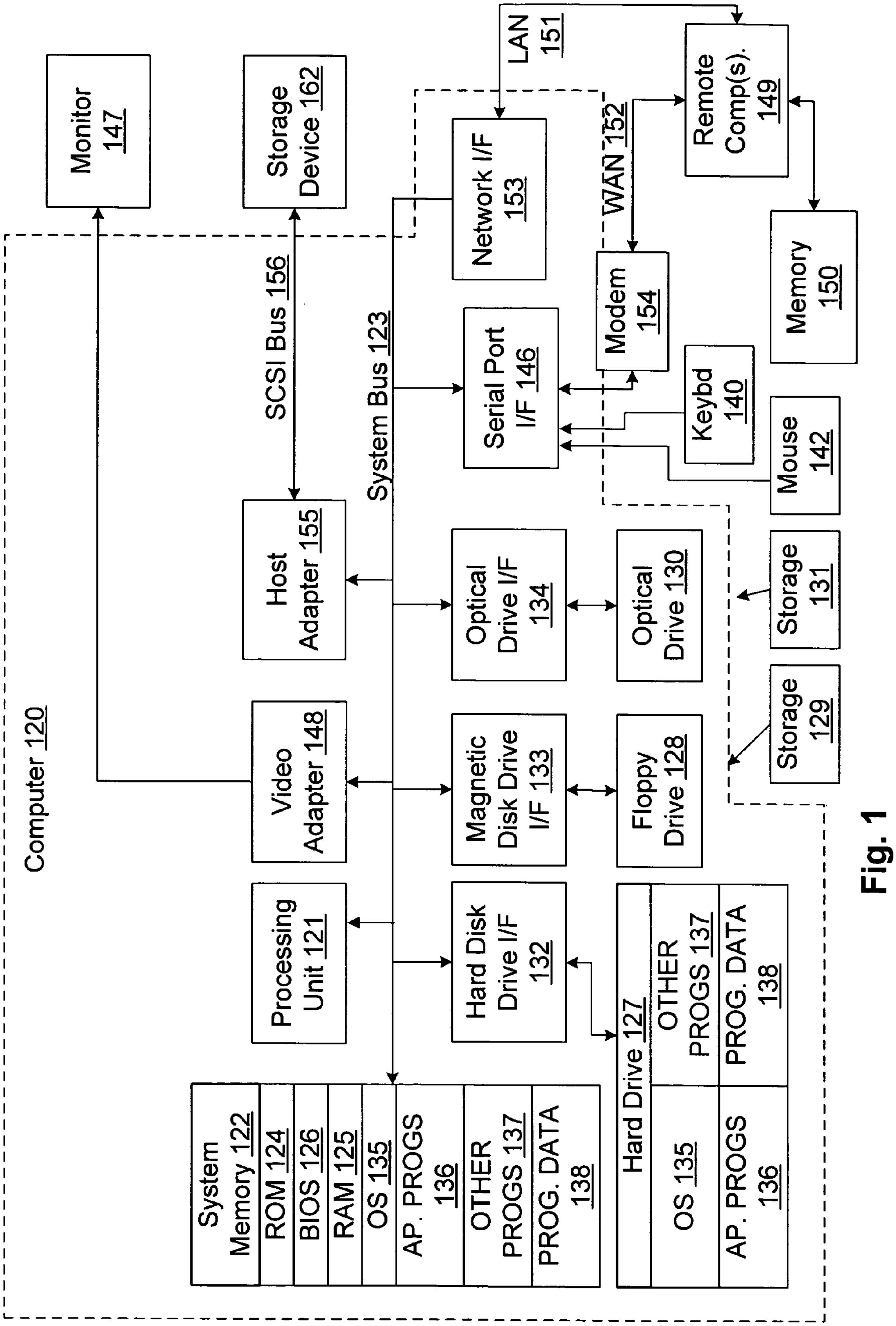
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Secure On-Line Voting

For on-line voting or any other voting to be secure and trustworthy, and in general, the voting process should at a minimum fulfill the requirements that: (1) only authorized voters can vote; (2) no voter can vote more than once in a contest; (3) no one can determine for whom any particular voter voted; (4) no voter can duplicate the vote of any other voter; (5) no one can change the vote of any voter without being discovered; and (6) every voter can make sure that the vote thereof has been tallied.

Figure 2:
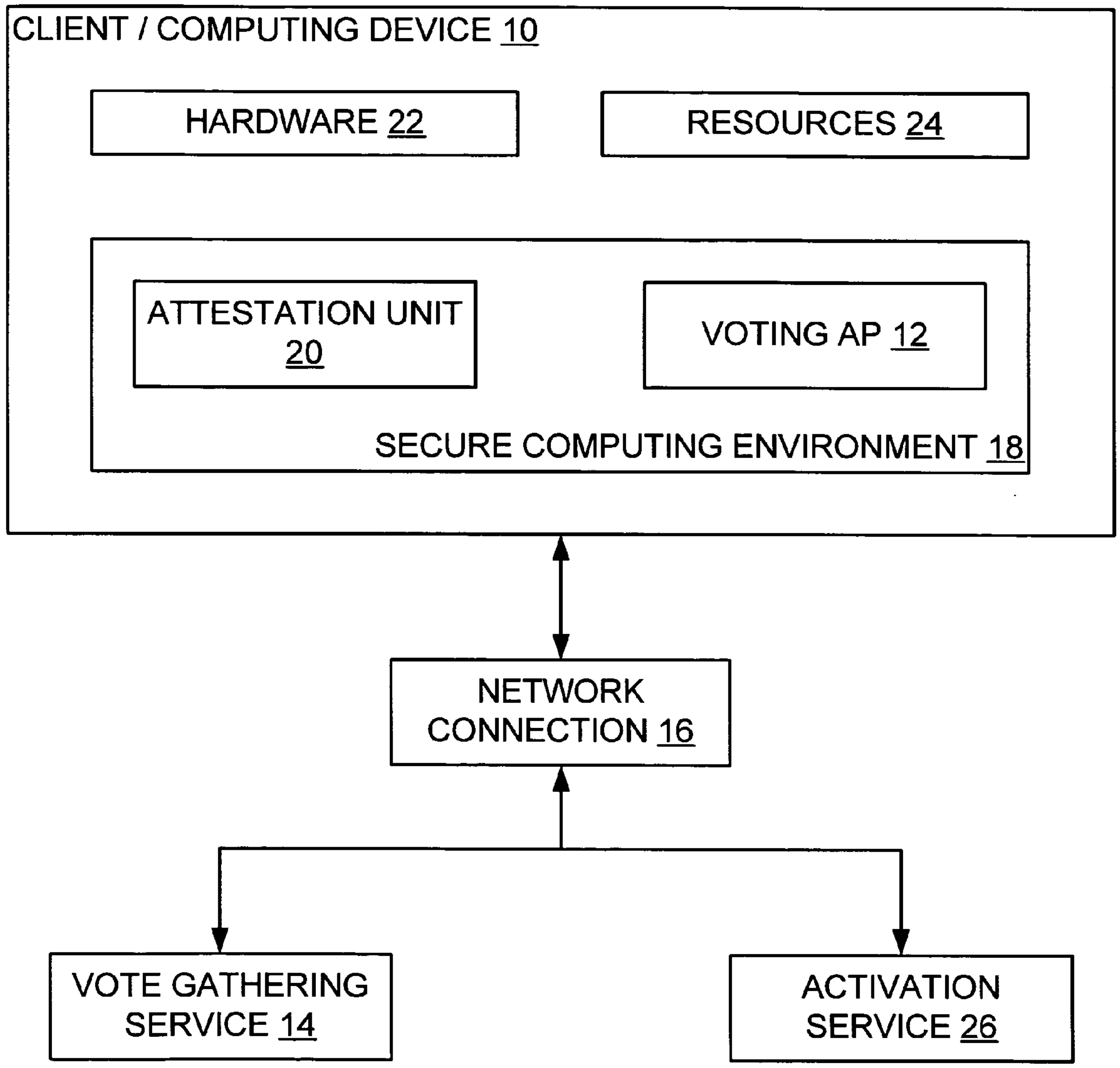
FIG. 2 is a block diagram showing an architecture of an on-line voting system in accordance with one embodiment of the present invention.

In the present invention, and turning now to FIG. 2, a voter creates a vote at a computing device 10 with a voting application 12 thereon. The computing device 10 is communicatively coupled to a vote gathering service 14 by way of an appropriate network connection 16, and the vote from the voter is securely transmitted to the vote gathering service 14 by way of the network connection 16 in a trustworthy manner. The vote gathering service 14 records the transmitted vote from the voter at the computing device 10, and ensures that the voter is in fact entitled to transmit the vote and also that the voter transmits the vote only once.

The vote as created by the voter may be with regard to an election, contest, or other determination, such as for example a municipal election, a union election, a ballot question, a membership board election, a popularity contest, and the like. Although not especially crucial to the present invention, such vote may comprise a single choice representing a single contested issue, or may comprise multiple choices representing multiple contested issues.

The computing device 10 employed by the voter may be any appropriate computing device without departing from the spirit and scope of the present invention. For example, the computing device may be a personal computer, a portable communications device, a wireless communications device, etc. Likewise, the network connection 16 coupling the computing device 10 and the vote gathering service 14 may be any appropriate network connection without departing from the spirit and scope of the present invention. Such connection 16 may for example be a direct connection or may be a network connection such as an intra- or inter-network connection employing appropriate communications protocols.

The vote gathering service 14 is typically an application running on a server, computer, or other computing device at a location remote from or local to the computing device 10, although such service 14 may instead be any other type of appropriate service without departing from the spirit and scope of the present invention. Such service 14 receives and verifies the transmitted vote from the voter at the computing device 10 in a manner that will be set forth in detail below. Such service 14 may also compile and tabulate transmitted votes from other voters to determine a winner of one or more contests or elections to which each vote relates, or may certify the votes and deliver same to another service which performs such compiling and tabulating. Presumably, such service 14 and related services are run by or on behalf of a vote counting authority which is responsible for overseeing the election or contest to which each vote relates.

The voting application 12 on the computing device 10 and employed by the voter may be any appropriate voting application without departing from the spirit and scope of the present invention. For example, the voting application 12 may be an executable, may be a library of functions to be executed by a virtual machine, may be a plug-in to another application, or may be executable code delivered to the voter at the computing device 10 as part of a page of information or the like. In addition, the voting application 12 may contain therewith information specific to a particular contest, or may allow information specific to a particular contest to be provided to the voter by way of downloading same from the vote gathering service 14 or the like by way of the network connection 16. Moreover, such voting application 12 may be produced and delivered by or on behalf of the vote counting authority, may be part of an operating system running on the computing device 10, may be developed by a third party, or the like. The voting application 12 may be delivered by any appropriate conveyance such as for example by download, by electronic mail, by regular mail, by pick-up from a distribution site, or the like.

In one embodiment of the present invention, and as seen in FIG. 2, the voting application 12 is run on the computing device 10 of the voter within the context of a secure computing environment 18 operating on the computing device 12, where the secure computing environment 18 is to be trusted by the vote counting authority by way of the vote gathering service 14. Thus, the secure computing environment 18 should be able to demonstrate such trust to the vote gathering service 14, such as for example by way of being able to proffer a key, digital signature, digital certificate, or the like. Typically, such a digital certificate includes a chain of certificates leading back to a root trust authority, and the vote gathering service 14 accepts the digital certificate and grants trust based thereon if the vote gathering service 14 recognizes and honors the root trust authority of such certificate.

As may be appreciated, the secure computing environment 18 operating on the computing device 10 of the voter should be free of control by other entities operating on the computing device 10 thereof or of control by other entities, either from other computing devices or of human form. Thus, the secure computing environment 18 should not be able to be forced to transmit a vote when such vote is not warranted, such as for example may be the case should a nefarious entity wish to transmit a vote without approval of the voter. Likewise, the secure computing environment 18 should not be able to be forced to alter a vote from a voter, such as for example the nefarious entity may wish to do.

Such secure computing environment 18 may be any appropriate secure computing environment without departing from the spirit and scope of the present invention, subject of course to the constraints set forth herein. For example, the secure computing environment 18 may be a trusted portion of an operating system on the computing device 10, where the trusted portion of such operating system is free of undue external influence. The secure computing environment 18 may either itself perform secure actions, or may establish trust in a secure application running thereon to perform secure actions. In one embodiment of the present invention, the secure computing environment 18 in fact includes an attestation unit 20 as an application running thereon and/or hardware running therein to perform secure actions and/or attest to the security thereof.

The attestation unit 20 may be any appropriate hardware and/or software without departing from the spirit and scope of the present invention. For example, the attestation unit 20 may be established as trusted software running in a trusted area of the secure computing environment 18, or may be a piece of hardware on the computing device 10 that is designed to perform attestation functions. In either case, such attestation unit 20 is protected from being monitored or influenced by any other software or hardware operating on the computing device, and especially is protected against attacks such as may be employed by a nefarious entity that would attempt to subvert the function of the attestation unit 20. The attestation unit 20, then, should be designed to be tamper proof, and should be capable of digitally signing, verifying a signature, encrypting, decrypting, and the like. Such an attestation unit 20 at a minimum should be apparent to the relevant public and therefore need not be set forth herein in any detail.

Note that the secure computing environment 18 and/or attestation unit 20 thereof likely must accept inputs that derive from hardware 22 on the computing device 12 that a voter would employ in the course of creating a vote in conjunction with the voting application 12. For example, such hardware 22 may include a touch screen, a keyboard, a cursor control device such as a mouse, and the like. In addition, the secure computing environment 18/attestation unit 20 may refer to other resources 24 of the computing device 12 such as a clock, memory, a controller, and the like. Each such piece of hardware 22 and each such resource 24, then, may become an avenue by which a nefarious entity might attempt to improperly subvert proper creation of a vote by a voter. Accordingly, each such piece of hardware 22 and each such resource 24 may be constructed to be trusted by the attestation unit 20, and also to be able to demonstrate such trust to the attestation unit 20, such as for example by way of being able to proffer a key, digital signature, digital certificate, or the like. Again, such a digital certificate typically includes a chain of certificates leading back to a root trust authority, and the secure computing environment 18 accepts the digital certificate and grants trust based thereon if such attestation unit 20 recognizes and honors the root trust authority of such certificate.

Note that by running the voting application 12 within the context of the secure computing environment 18, and presuming that the secure computing environment 18 provides a trusted path between the voter and the vote gathering service 14, there is an implicit guarantee that the vote as received by the vote gathering service 14 is indeed from the voter at the computing device 10, and not some nefarious entity wishing to do no good. Moreover, the voting options presented to the voter by way of the voting application 12 are trusted and the vote as created by the voter is likewise trusted. In addition, since the secure computing environment 18 presumably provides strong process isolation, there is also an implicit guarantee that no other rogue application is modifying or changing the vote as was created by the voter. Finally, since the secure computing environment 18 presumably includes the attestation unit 20, the vote gathering service 14 can be provided with an attestation that the voting application 12 is indeed to be trusted.

The vote itself as created by the voter with the voting application 12 may take any appropriate form without departing from the spirit and scope of the present invention. For example, the vote may be constructed as a digital document based on some form of extensible Markup Language (XML) and may be digitally signed based on a private key and verifiable according to a corresponding public key available from the aforementioned digital certificate of the secure computing environment 18, a digital certificate of the attestation unit 20, or another digital certificate. Thus, such created vote may include such digital certificate. In addition, such created vote may be protected according to a secret shared with the vote gathering service 14 or the like, such as for example a symmetric or asymmetric key.

With the architecture as shown in FIG. 2, the voter may during a predetermined voting period employ the voting application 12 on the computing device 10 to create a vote and transmit same to the vote gathering service 14. Such vote gathering service 14 may in addition to receiving such transmitted vote also receive an attestation as provided by the attestation unit 20 of the computing device 10, where such attestation describes the voting application 12 and also describes the voter by way of one or more identifying indicia thereof.

In one embodiment of the present invention, the process of implementing on-line voting by way of an architecture such as that shown in FIG. 2 may be divided into three main parts: distribution of the voting application 12, activation of the voting application 12, and voting with the voting application 12. Each is disclosed in turn, below.

Figure 3:
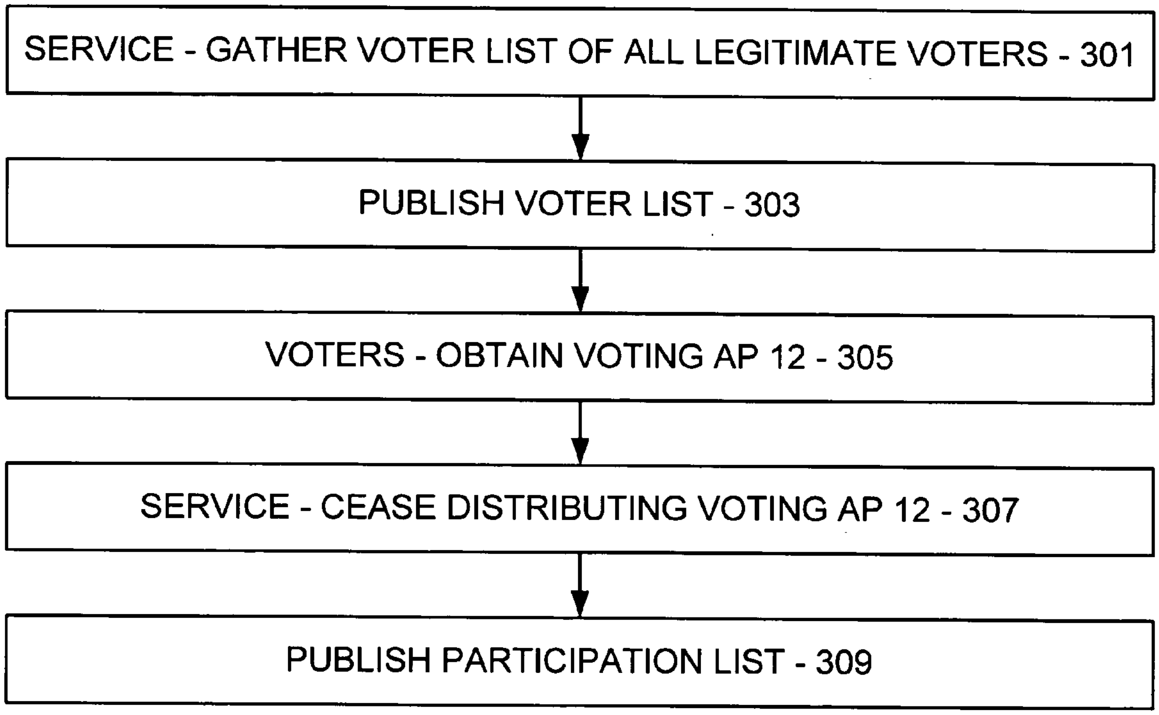
FIGS. 3–5 are flow diagrams showing key steps performed in connection with the architecture of FIG. 2 to distribute a voting application to a voter (FIG. 3), activate the distributed voting application (FIG. 4), and vote with the activated voting application (FIG. 5), all in accordance with one embodiment of the present invention.

In one embodiment of the present invention, to distribute the voting application 12, and turning now to FIG. 3, the vote gathering service 14 or another service first gathers a voter list of all legitimate voters (step 301), and then publishes the voter list (step 303) so that all voters thereon are given notice to obtain the voting application 12 from an appropriate source (step 305). Upon in fact obtaining the voting application 12, each voter is expected to install and activate such voting application 12 on an appropriate computing device 10 thereof with a secure computing environment 18 and attestation unit 20, as will be set forth in more detail below. Note that the voter list may be gathered as at step 301 in any appropriate manner without departing from the spirit and scope of the present invention. For example, for a public election, the voter list may be a certified voter list as compiled and maintained by an election board, while for a private contest the voter list may be a previously compiled list of contest entrants. Publishing the voter list as at step 303 may likewise be performed in any appropriate manner without departing from the spirit and scope of the present invention, such as for example by posting a hard copy of the voter list at one or more physical locations and/or posting a soft copy of the voter list on a network-accessible location.

The source from which the voting application 12 may be obtained by each voter on the voter list as at step 305 may again be any appropriate source without departing from the spirit and scope of the present invention. For example, such source may for example be an on-line source, a physical location from which media with the voting application 12 may be collected, or the like. Alternatively, the voting application 12 may be delivered to each voter on the voter list by way of regular mail, electronic mail, or the like. In at least some circumstances, the voter application 12 should only be distributed to each voter if on the voter list, and/or only after the voter has confirmed the identity thereof. Such identity confirmation may be achieved by way of submission of an ID card from an appropriate issuing entity, in which case such confirmation may be physically performed, or by submission of a digital certificate or the like, again from an appropriate issuing entity, in which case such confirmation may be performed by way of the network connection 16 or the like.

After a period of time during which each voter on the voter list has had an opportunity to collect the voting application 12 as at step 305, and of course prior to the contest corresponding to the voting application 12, the vote gathering service 14 ceases distributing such voting application 12 (step 307) and then publishes a participation list (step 309). Such period of time may be any appropriate duration, such as for example a period of days or weeks or even a month or two. Similar to publishing the voter list as at step 303, publishing the participation list as at step 309 may be performed in any appropriate manner without departing from the spirit and scope of the present invention, such as for example by posting a hard copy of such list at one or more physical locations and/or posting a soft copy of such list on a network-accessible location. The participation list typically is based on each voter that has obtained the voting application 12. As may be appreciated, publishing the participation list as at step 309 confirms each voter that has obtained a copy of the voting application 12, and also acts to inspire confidence by all voters and others in the vote gathering process.

In one embodiment of the present invention, and at a designated period of time either before or after the participation list has been published as at step 309 but before the period of time set for voting in the contest, each voter with an obtained copy of the voting application 12 must install and activate such obtained voting application 12. Presumably, the voting application 12 includes an appropriate installer or the like to install same on the computing device 10 of a voter. At a minimum, such voting application 12 and the installer thereof should allow the installation to take place only if the computing device 10 includes the secure computing environment 18 and attestation unit 20 of FIG. 2, and can satisfy other appropriate minimum security and/or trustworthiness concerns. If for some reason the voting application 12 cannot be installed on any computing device 10 of the voter, the voter must vote in person at a physical voting location or else cannot vote in the contest.

Figure 4:
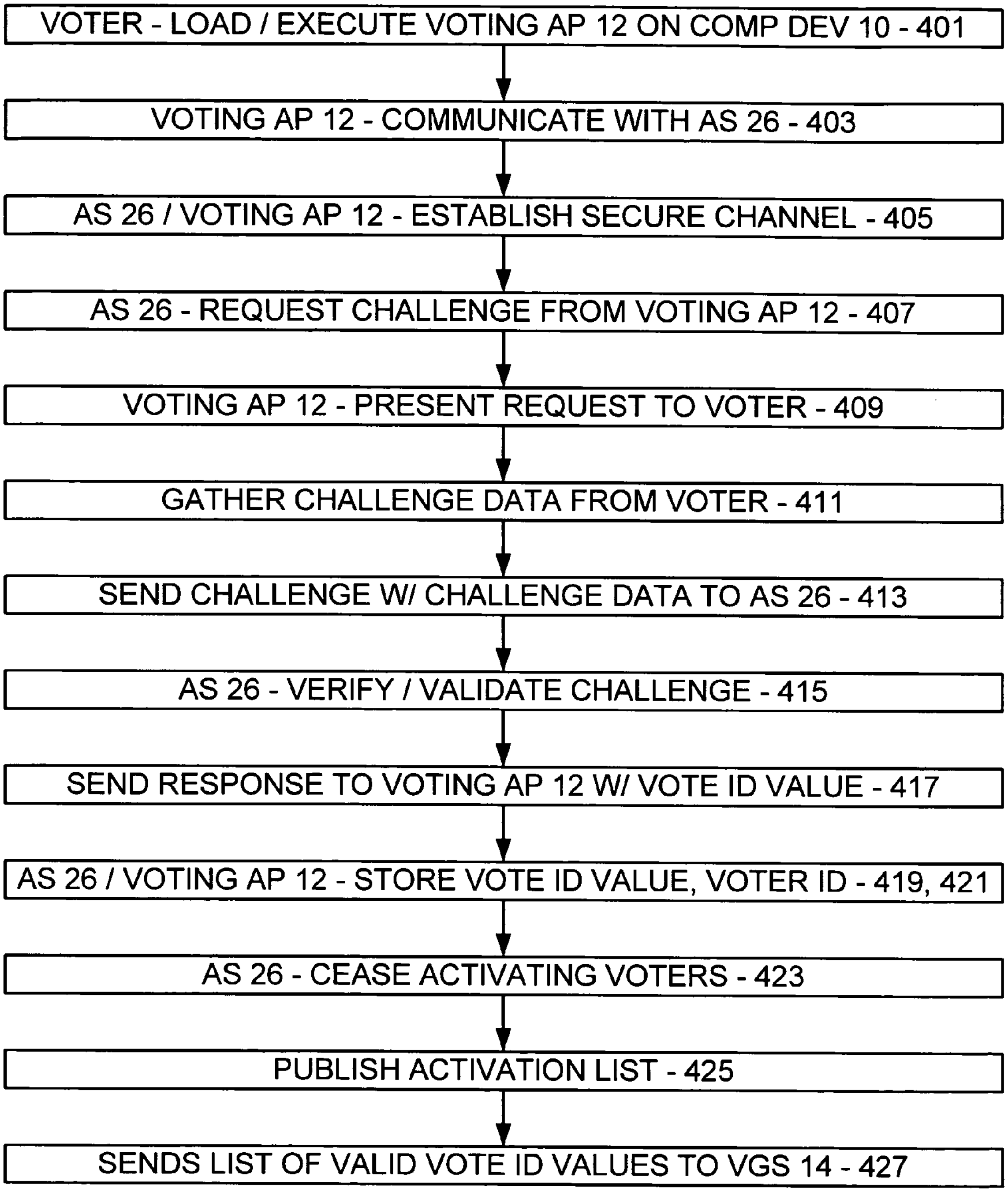

Turning now to FIG. 4, to install and activate the voting application 12 on a computing device 10 of a voter, such voter loads the voting application 12 onto the computing device 10 and executes same (step 401). As may be appreciated, in executing the voting application 12, the installer thereof may load one or more files or other objects onto the computing device 10, and may also perform some preliminary security and/or trustworthiness checks, such as for example to ensure that the computing device 10 in fact includes the secure computing environment 18 and attestation unit 20 of FIG. 2. As was set forth above, the voting application 12 should allow itself to be executed only in such secure computing environment 18 so that the operation thereof cannot be observed by any nefarious entity.

Presuming that such preliminary checks are in fact satisfied, and in one embodiment of the present invention, the voting application 12 establishes communication by way of the network connection 16 with an activation service 26 which may be provided by the vote gathering service 14 or may be associated therewith (step 403). Presumably, the activation service 26 can verify the identity of the communicating voting application 12, perhaps by way of the attestation unit 20 of the computing device 12. Of course, if not verified, the activation service 26 does not allow the voting application 12 to activate on the computing device 10. However, presuming that the voting application 12 does indeed verify, the activation service 26 and the voting application 12 establish a secure channel therebetween (step 405), such as for example by way of establishing a shared symmetric key by which messages may be encrypted and decrypted.

Thereafter, the activation service 26 requests a challenge from the voting application 12 by way of the secure channel (step 407), where the challenge includes data to identify the voter and verify the identity of the voter at the voting application 12. Such challenge data may be any appropriate identifying information without departing from the spirit and scope of the present invention, and typically includes a name or number associated with the voter, and perhaps some information that only the identified voter would know, or else some sort of biometric or forensic data that has been positively established as being that of the identified voter. At any rate, the voting application 12 presents the request for the challenge to what presumably is the voter at the computing device 10 (step 409), typically in the form of a user interface that the voter is to fill in with the appropriate challenge data by way of appropriate input hardware 22 on the computing device 10, and then gathers at least a portion of the challenge data from the voter thereby (step 411). In addition, the voting application 12 may gather additional challenge data from the voter such as the aforementioned biometric or forensic data by way of other hardware 22 on the computing device 10. In any case, the hardware 22 employed should be trusted to faithfully transmit data to the voting application 12 by way of a trusted path not influenced by any nefarious entity, where such trust may be established by way of the attestation unit 20 of the computing device 10.

Upon collecting the challenge data and appropriately organizing same into a form amenable to the activation service 26, the voting application 12 then sends the requested challenge including the collected challenge data to such activation service 26 by way of the secure channel established therebetween as at step 405 (step 413). On receiving the challenge, then, the activation service 26 appropriately verifies and validates same (step 415). Such verification and validation may be performed in any appropriate manner without departing from the spirit and scope of the present invention. For example, presuming the challenge includes a digital signature from the voting application 12 or elsewhere and attestation information as provided by the attestation unit 20 of the computing device, such verifying may include ensuring that the digital signature verifies and that the attestation information is acceptable. Also for example, such validating may include comparing the challenge data from the voter with previously established data for the identified voter to ensure that the identified voter in fact provided the challenge data, and is in fact allowed to vote.

Presuming the challenge verifies and validates, then, the activation service 26 sends a response to the voting application 12 by way of the secure channel established therebetween as at step 405 (step 417), where the response includes a vote identification value. As may be appreciated, such vote identification value is a random or non-random value that is to be employed by the voting application 12 when the voter votes therewith to identify the voter as being activated, as will be set forth below. Such vote identification may for example be a randomly generated large (128-bit, e.g.) value.

Of course, the activation service 26 and the voting application 12 should each store the vote identification value and an identification of the voter in respective appropriate databases for later retrieval (steps 419, 421). Note that along with the vote identification value and the identification of the voter, the activation service 26 may also store the challenge data from the challenge. Note, too, that inasmuch as voting should be anonymous, the activation service 26 in particular should be careful to ensure that a vote once created and cast is not tied back to a particular voter by way of the vote identification. Note, further, that the database employed by the voting application 12 on the computing device 12 to store the vote identification value and the identification of the voter should be a secure database that can only be accessed by the voter at the voting application 12 and no others.

As should now be appreciated, with such vote identification, the identified voter is now successfully activated to vote with the voting application 12 in connection with a particular contest. As should also be appreciated, receiving the vote identification acts to notifying the voting application 12 and the voter thereat that the activation thereof was successful.

After a period of time during which each voter on the participation list has had an opportunity to activate as set forth above, and of course prior to the contest corresponding to the voting application 12, the activation service 26 ceases activating voters (step 423) and may then publish an activation list (step 425). Such period of time may as before be any appropriate duration, such as for example a period of days or weeks or even a month or two. Similar to before, publishing the activation list as at step 425 may be performed in any appropriate manner without departing from the spirit and scope of the present invention, such as for example by posting a hard copy of such list at one or more physical locations and/or posting a soft copy of such list on a network-accessible location. The activation list as should be appreciated is based on each voter that has activated in connection with a particular contest, and confirms each voter that has activated to vote by way of the architecture of FIG. 2, and also acts to inspire confidence by all voters and others in the vote gathering process.

In addition, after the activation service 26 ceases activating voters as at step 423, such activation service 26 sends a list of all valid vote identification values to the vote gathering service 14 (step 427) which as seen below will be used by such vote gathering service during a particular contest in connection with actual vote gathering. Presumably, such activation service 26 sends the list of all valid vote identification values to the vote gathering service 14 by way of a secure channel so as to avoid revealing such list to any nefarious entity that may attempt to view same. As may be appreciated, the sent list of all valid vote identification values does not include the corresponding identifications of the voters. Thus, the vote gathering service 14 cannot itself tie a particular vote back to a particular voter by way of such vote identification.

Figure 5:
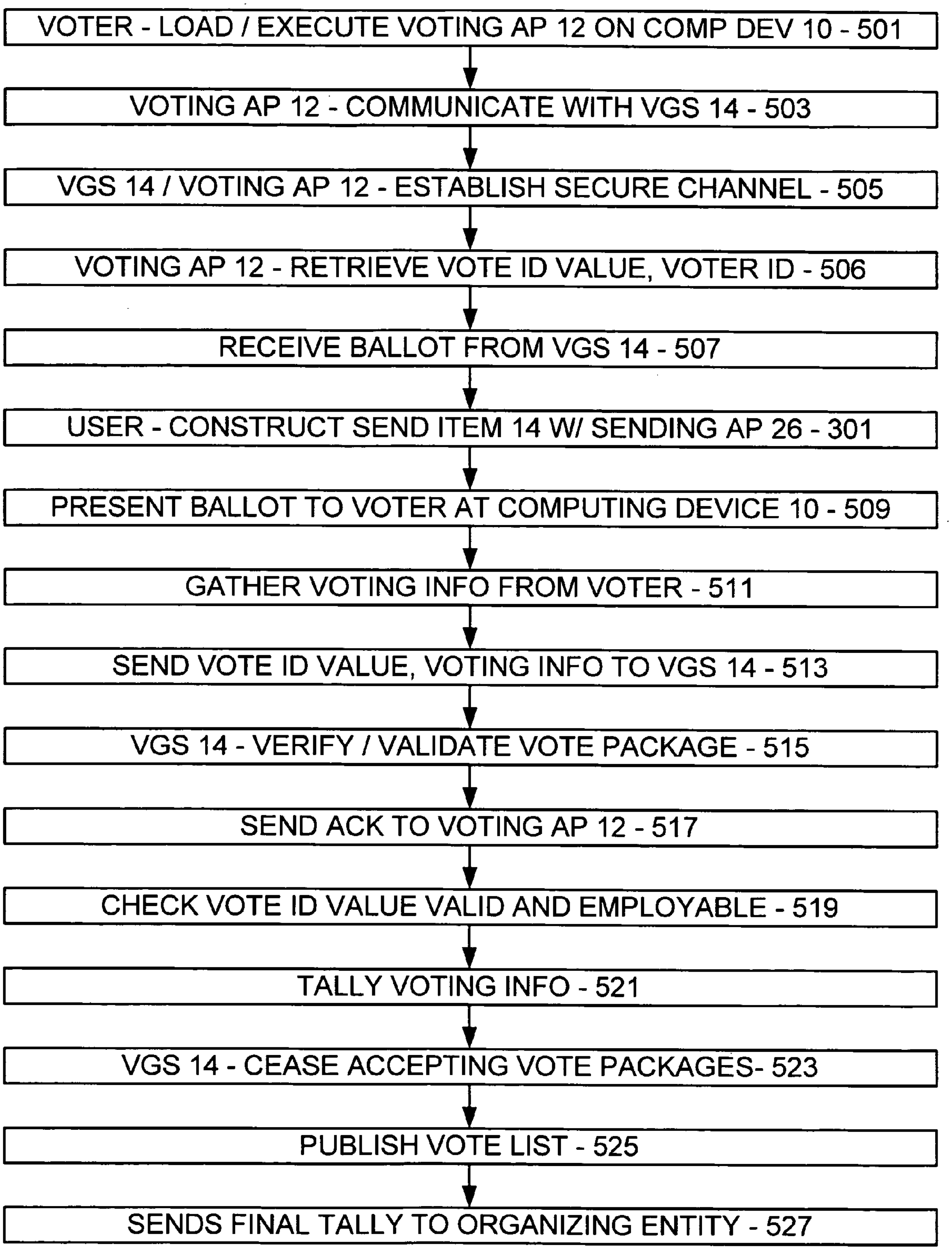

Presumably, actual voting for the particular contest is to take place over a particular period of time such as for example a period of hours or days or even weeks or months. At any rate, and turning now to FIG. 5, to vote during the actual voting for the particular contest, the voter again executes the voting application 12 on the computing device 10 (step 501), and the voting application 12 again establishes communication by way of the network connection 16, although now with the vote gathering service 14 (step 503). Again presumably, the vote gathering service 14 can verify the identity of the communicating voting application 12, perhaps by way of the attestation unit 20 of the computing device 12. Of course, if not verified, the vote gathering service 14 does not allow the voting application 12 to proceed. However, presuming that the voting application 12 does indeed verify, the vote gathering service 14 and the voting application 12 establish a secure channel therebetween (step 505), such as for example by way of establishing a shared symmetric key by which messages may be encrypted and decrypted.

In the case where the vote identification value and the identification of the voter are stored in a secure database that can only be accessed by the voter at the voting application 12 and no others, the voter application 12 can presume that, having been executed by the voter, such voting application 12 may merely retrieve such vote identification value and the identification of the voter from the database (step 506). Alternatively, the voting application 12 may interrogate the voter for appropriate information to verify the voter in connection with such retrieval. For example, the voting application 12 may confirm that the voter can provide the identification thereof as set forth in the database.

At any rate, the voting application 12 receives a ballot from the vote gathering service 14 by way of the secure channel established therebetween (step 507), presents the ballot to the voter at the computing device 10 (step 509), typically in the form of a user interface that the voter is to fill in with appropriate voting information by way of appropriate input hardware 22 on the computing device 10, and then gathers the voting information from the voter thereby (step 511). As before, the hardware 22 employed should be trusted to faithfully transmit the voting information from the voter to the voting application 12 by way of a trusted path not influenced by any nefarious entity, where such trust may be established by way of the attestation unit 20 of the computing device 10.

Upon collecting the voting information from the voter and appropriately organizing same into a form amenable to the vote gathering service 14, the voting application 12 then sends a vote package with the vote identification value as retrieved from the database together with such voting information to the vote gathering service 14 by way of the secure channel established therebetween as at step 505 (step 513). On receiving the vote package, then, the vote activation service 26 appropriately verifies and validates same (step 515). Such verification and validation may be performed in any appropriate manner without departing from the spirit and scope of the present invention. For example, presuming the vote package includes a digital signature from the voting application 12 or elsewhere and attestation information as provided by the attestation unit 20 of the computing device, such verifying may include ensuring that the digital signature verifies and that the attestation information is acceptable. Also for example, such validating may include comparing the vote identification value from the vote package with the list of all valid vote identification values as provided by the activation service 26 to the vote gathering service 14 at step 427, above, to ensure that the vote package is from an activated voter.

Presuming the vote package verifies and validates, then, the vote gathering service 14 sends an appropriate acknowledgment to the voting application 12 by way of the secure channel established therebetween as at step 505 (step 517). In addition, the vote gathering service 14 notes with regard to the list of all valid vote identification values that the vote identification value from the vote package has been employed and also that such vote identification value from the vote package has not been previously employed by another vote package (step 519), and then appropriately tallies the voting information from the vote package (step 521). Note that if it is found that the vote identification value from the vote package has in fact been previously employed by another vote package, the vote gathering service may either choose to ignore the voting information in the vote package and not tally same, or may choose to tally such voting information and in so doing overwrite the tallied voting information from the prior vote package, presuming of course such an option is available.

After the period of time during which each voter on the activation list has had an opportunity to vote as set forth above, the vote gathering service 14 ceases accepting vote packages (step 523) and may then publish a hard copy and/or soft copy of a vote list (step 525) detailing activated voters that voted. Note here, though, that such a vote list may not at all times be desired, although such a vote list may be employed to confirm that each activated voter did in fact vote by way of the architecture of FIG. 2, and also acts to inspire confidence by all voters and others in the vote gathering process. If in fact a vote list is published, such vote list should not detail specific votes.

In addition, after the vote gathering service 14 ceases accepting vote packages as at step 523, such activation service 26 may send a final tally to an organizing entity or board (step 527), together with an appropriate certification and perhaps details regarding the final tally. Of course, such final tally and related information may be in any appropriate form and at any appropriate level of detail without departing from the spirit and scope of the present invention.

In one embodiment of the present invention, the vote package sent to the vote gathering service 14 as at step 513 includes the voting information therein in an encrypted form. As should be appreciated, such encryption adds an additional level of security, especially if there is any concern that the vote gathering service may be capable of adding or subtracting votes. In such situation, the voting application generates a key for encrypting the voting information and encrypts same therewith, sends the vote package with the encrypted voting information as at step 513, and receives the acknowledgment as at step 517.

In such embodiment, the vote gathering service 14 does not decrypt the encrypted voting information and tally same as at step 521 until after the period of time for the contest has concluded and the vote gathering service 14 has ceased to accept voting packages, as at step 523. Instead, in such embodiment, once the acknowledgment is received, the voting application 12 breaks the secure channel with the vote gathering service 14 to conclude a first session, and waits for the contest to conclude.

Significantly, upon such conclusion, the vote gathering service 14 publishes the total number of votes, and thereafter, the voting application 12 again establishes a secure channel with the vote gathering service 14, this time to conduct a second session. In such second session after such publication, the voting application 12 sends a decryption key to the vote gathering service 14 by which such vote gathering service 14 may decrypt the encrypted voting information, and such vote gathering service 14 thereafter in fact decrypts the encrypted voting information with such decryption key and then tallies same as at step 521. Presumably, in such embodiment, the number of votes published by the vote gathering service 14 should equal the total votes in the final tally sent by such vote gathering service to the organizing entity or board as at step 527. Otherwise, the vote gathering service 14 may have improperly added or subtracted votes.

With the present invention as set forth above and in the drawings, secure on-line voting may be achieved by way of a computing device 10 of a voter. In particular, such voting is secure in that the secure computing environment 18 on the computing device establishes trust with the hardware 22 employed by the voter, and also prevents malicious software or hardware from interfering with the operation of the voting application 12 running thereon. Since each voter can only access the vote identification value arranged for such voter, multiple voters can vote with the same computing device 10. In fact, the computing device 10 may even be set up as a more-or-less traditional voting booth in a polling location.

The architecture of the present invention requires that the voter employ a computing device 10 with a secure computing environment 18 thereon, but otherwise represents no substantial cost to the user. Presumably, each voter is provided with a voting application 14 at no cost, and the computing device 10 already has the network connection 16 to contact the vote gathering service 14 and the activation service 26. From the point of view of the organizing entity or board, employing the architecture of the present invention can potentially result in a huge cost savings, especially for a contest with a large number of voters that would otherwise have to be accommodated at traditional polling locations. Instead, such organizing entity or board or an agent thereof need only maintain the vote gathering service 14 and the activation service 26 and perhaps related services, and provide the copies of the voting applications 12 to the voters.

Note that although the present invention has been set forth in terms of three main parts: distribution of the voting application 12, activation of the voting application 12, and voting with the voting application 12, it is to be appreciated that at least some of such parts may be combined in certain circumstances without departing from the spirit and scope of the present invention. For example, it may be the case that distribution and activation occur as one unified process, or that activation and voting take place as one unified process. Note, too, that although the present invention includes several occasions on which a list may be published, some or all of such lists may be dispensed with as deemed advisable or desired without departing from the spirit and scope of the present invention.

CONCLUSION

The present invention may be practiced with regard to any appropriate organizing entity or board conducting a contest or election, and with regard to any voter employing a computing device 10 with a voting application 12 operating in conjunction with a secure computing environment 18. As should now be appreciated, with the present invention as set forth herein, on-line voting may be performed in a manner so that a voter may securely vote in a trustworthy manner.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method for implementing secure and trustworthy voting from a place other than a polling location. Such voting is achieved by way of a computing device 10 appropriately coupled to a vote gathering service 14 and appropriately provisioned with a voting application 12, and is not prone to fraud or abuse.

It should be appreciated that changes could be made to the embodiments described above without departing from the inventive concepts thereof. In general it should be understood, therefore, that this invention is not limited to the particular embodiments disclosed, but it is intended to cover modifications within the spirit and scope of the present invention as defined by the appended claims.

The invention claimed is:

1. A method of collecting an on-line vote from a voter on-line at a networked computing device of said on-line voter, the method comprising:

receiving at an activation service remote from but networked to the computing device of the voter and from a voting application on the computing device of the voter a challenge including collected challenge data identifying the voter and verifying the identity of the voter at the voting application;

verifying and validating at the remote activation service the challenge and challenge data therein at least in part to ensure that the identified voter in the challenge data in fact provided the challenge data, and is in fact allowed to vote;

sending a response from the remote activation service to the voting application, the response including a vote identification value identifying the voter as being activated;

storing by the remote activation service the vote identification value and an identification of the voter in a database remote from the computing device of the voter;

sending a ballot from a vote gathering service remote from but networked to the computing device of the voter and to the voting application, the ballot including at least one contest for the voter to vote on, the voting application presenting the ballot to the voter and gathering voting information from the voter based thereon;

receiving at the remote vote gathering service from the voting application a vote package with the vote identification value and the gathered voting information;

verifying and validating at the remote vote gathering service the vote package and vote identification value therein at least in part to ensure that the vote identification value matches the vote identification value from the database;

noting by the remote vote gathering service in the database that the vote identification value from the vote package has been employed; and tallying by the remote vote gathering service the voting information from the vote package, the remote activation service and the remote vote gathering service not having control of the computing device of the on-line voter but verifying and validating the challenge and the vote package to impart trust to the computing device and the voting application thereon.

2. The method of claim 1 further comprising providing the voter with the voting application.

3. The method of claim 1 comprising sending to and receiving from the voting application on the computing device of the voter by way of a secure channel established therebetween.

4. The method of claim 1 comprising:

receiving the vote package with gathered voting information in an encrypted form;

publishing a total number of votes and thereafter receiving from the voting application by way of a secure channel a decryption key; and decrypting the encrypted voting information with such decryption key.

5. The method of claim 1 comprising the activation service sending the vote identification value to the vote gathering service without the identification of the voter, whereby the vote gathering service cannot itself tie the vote package back to the voter by way of said vote identification value.

6. The method of claim 1 wherein at least one of the challenge and the vote package further includes a digital signature and wherein verifying and validating at least one of said challenge and said vote package includes verifying the digital signature thereof.

7. The method of claim 1 wherein at least one of the challenge and the vote package further includes attestation information from an attestation unit on the computing device, the attestation information attesting to a trustworthiness of the computing device, and wherein verifying and validating at least one of such challenge and such vote package includes ensuring that the attestation information thereof is acceptable.

8. The method of claim 1 further comprising verifying an identity of the voting application prior to sending at least one of the response and the ballot.

9. The method of claim 8 wherein verifying an identity of the voting application comprises accepting a statement from an attestation unit on the computing device.

10. The method of claim 1 comprising sending a response to the voting application including a vote identification value comprising a randomly generated value.

11. The method of claim 1 further comprising publishing an activation list after sending the activating response and before sending the ballot, the activation list including each voter that has been sent the activating response in connection with the sent ballot.

12. The method of claim 1 comprising receiving from the voting application a first vote package with the vote identification value and a first set of the gathered voting information, receiving from the voting application a second vote package with the vote identification value and a second set of the gathered voting information, and ignoring the second set of the voting information in the second vote package and not tallying same.

13. The method of claim 1 comprising receiving from the voting application a first vote package with the vote identification value and a first set of the gathered voting information, receiving from the voting application a second vote package with the vote identification value and a second set of the gathered voting information, and tallying the second set of the voting information in the second vote package and in so doing overwriting the tallied first set of the voting information from the first vote package.

14. The method of claim 1 further comprising publishing a vote list after receiving and tallying the voting information in the vote package, the vote list including each voter that has voted in connection with the sent ballot.

15. A method for a voting application on a networked computing device of a voter to collect an on-line vote from a voter on-line at the computing device, the method comprising:

sending a challenge from the computing device to an activation service remote from but networked to the computing device of the voter, the challenge including collected challenge data identifying the voter and verifying the identity of the voter, the remote activating service verifying and validating the challenge and challenge data therein at least in part to ensure that the identified voter in the challenge data in fact provided the challenge data, and is in fact allowed to vote;

receiving at the computing device a response from the remote activation service including a vote identification value identifying the voter as being activated;

receiving at the computing device ballot from a vote gathering service remote from but networked to the computing device of the voter, the ballot including at least one contest for the voter to vote on;

presenting the ballot to the voter on-line at the computing device and gathering voting information from the voter based thereon;

sending from the computing device to the remote vote gathering service a vote package with the vote identification value and the gathered voting information, the remote vote gathering service verifying and validating the vote package and vote identification value therein at least in part to ensure that the vote identification value matches the vote identification value from the response, and tallying the voting information from the vote package, the remote activation service and the remote vote gathering service not having control of the computing device of the on-line voter but verifying and validating the challenge and the vote package to impart trust to the computing device and the voting application thereon.

16. The method of claim 15 comprising the voting application sending to and receiving from the activating service and the vote gathering service by way of a secure channel established therebetween.

17. The method of claim 15 comprising:

sending the vote package with gathered voting information in an encrypted form; and sending a decryption key after the vote gathering service has published a total number of votes, whereby the vote gathering service decrypts the encrypted voting information with such decryption key.

18. The method of claim 15 comprising sending at least one of the challenge and the vote package with a digital signature, whereby verifying and validating at least one of such challenge and such vote package includes verifying the digital signature thereof.

19. The method of claim 15 comprising sending at least one of the challenge and the vote package with attestation information from an attestation unit on the computing device, the attestation information attesting to a trustworthiness of the computing device, whereby verifying and validating at least one of such challenge and such vote package includes ensuring that the attestation information thereof is acceptable.

20. The method of claim 15 further comprising sending an identification of the voting application prior to sending at least one of the challenge and the vote package.

21. The method of claim 20 wherein sending the identification of the voting application comprises sending a statement from an attestation unit on the computing device.

* * * * *